United States Patent
Vilkner (10) Patent No.: US 9,062,722 B2
(45) Date of Patent: Jun. 23, 2015

(54) CLUTCH DEVICE AND A WEAR ADJUSTMENT ASSEMBLY FOR A CLUTCH DEVICE

(71) Applicant: Schaeffler Technologies AG & Co. KG, Herzogenaurach (DE)

(72) Inventor: Martin Vilkner, Sinzheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/057,809

(22) Filed: Oct. 18, 2013

(65) Prior Publication Data

US 2014/0048376 A1 Feb. 20, 2014

Related U.S. Application Data

(63) Continuation of application No. PCT/DE2012/000365, filed on Apr. 5, 2012.

(30) Foreign Application Priority Data

Apr. 20, 2011 (DE) .......................... 10 2011 018 369

(51) Int. Cl.
*F16D 13/75* (2006.01)

(52) U.S. Cl.
CPC .............. *F16D 13/75* (2013.01); *F16D 13/757* (2013.01)

(58) Field of Classification Search
CPC .................................. F16D 13/75; F16D 13/38
USPC ................. 192/70.251–70.252, 111.4, 111.5, 192/111.15, 111.18–111.2
See application file for complete search history.

(56) References Cited

U.S. PATENT DOCUMENTS

| 6,053,297 A | 4/2000 | Kummer |
| 6,619,637 B1 | 9/2003 | Juriga |
| 2009/0218188 A1* | 9/2009 | Dussel et al. ............ 192/70.252 |

FOREIGN PATENT DOCUMENTS

| DE | 19960641 A1 | 9/2000 |
| DE | 10025532 A1 | 11/2001 |
| DE | 102008031953 A1 | 1/2009 |
| DE | 102010006054 A1 | 8/2010 |
| DE | 102010006055 A1 | 8/2010 |

(Continued)

OTHER PUBLICATIONS

Raw translation of DE102010006054A1, WILDT, Aug. 9, 2010, pp. 1-53.*

*Primary Examiner* — Rodney H Bonck
*Assistant Examiner* — Lillian Nguyen
(74) *Attorney, Agent, or Firm* — Simpson & Simpson, PLLC (57) ABSTRACT

A clutch device having at least one torque transmission device, which has at least one pressure plate which is connected non-rotatingly to a housing component, a pressing plate which may be moved non-rotatingly and in an axial direction with respect to the pressure plate, and a clutch plate which may be clamped in a frictionally engaged manner between the pressure plate and the pressing plate, and having at least one wear adjustment device which has at least one ramp ring which is rotatable in a circumferential direction by means of at least one coil spring for sensing and for compensating for wear-induced axial play between the housing component and the pressing plate, wherein the coil spring is mounted on the ramp ring side and on the housing component side, there being a hook-in securing means provided between the ramp ring and the coil spring.

20 Claims, 4 Drawing Sheets

(56) References Cited

FOREIGN PATENT DOCUMENTS

| DE | 102009029499 A1 | 3/2011 |
| DE | 102010050069 A1 * | 5/2011 |
| DE | 102011104962 A1 * | 2/2012 |
| GB | 585264 A | 2/1947 |

* cited by examiner

CLUTCH DEVICE AND A WEAR ADJUSTMENT ASSEMBLY FOR A CLUTCH DEVICE

CROSS-REFERENCE TO RELATED APPLICATIONS

This application is filed under 35 U.S.C. §120 and §365(c) as a continuation of International Patent Application No. PCT/DE2012/000365, filed Apr. 5, 2012, which application claims priority from German Patent Application No. 10 2011 018 369.8, filed Apr. 20, 2011, which applications are incorporated herein by reference in their entireties.

FIELD OF THE INVENTION

The present invention relates to a clutch device. In addition, the present invention relates to a coil spring, which is designed for a wear adjustment device of the clutch device.

BACKGROUND OF THE INVENTION

A clutch device is known from German Patent Application No. 10 2008 031 953. The clutch device has two torque transfer devices as frictionally engaged partial clutches, each of the torque transfer devices having a pressure plate that is non-rotatingly connected to a housing component, a pressing plate that is movable non-rotatingly and in an axial direction with respect to the pressure plate, and a clutch plate that is frictionally clampable between the pressure plate and the pressing plate. In addition, the clutch device has a wear adjustment device for each of the torque transfer devices. Each of the wear adjustment devices has a ramp ring that is rotatable in a circumferential direction by means of a plurality of wound coil springs to sense and compensate for wear-induced axial play between the housing component and the pressing plate. Each of the coil springs is mounted, on the one hand, on the ramp ring side and, on the other hand, on the housing component side, while the possibility exists that the coil spring will be separated from the ramp ring in the event of a brief blocking or jamming of the coil spring, or in the event of rotational speed fluctuations when the clutch device is operated.

BRIEF SUMMARY OF THE INVENTION

According to aspects illustrated herein, there is provided a clutch device having at least one torque transmission device, which has at least one pressure plate which is connected non-rotatingly to a housing component, a pressing plate which may be moved non-rotatingly and in an axial direction with respect to the pressure plate, and a clutch plate which may be clamped in a frictionally engaged manner between the pressure plate and the pressing plate, and having at least one wear adjustment device which has at least one ramp ring which is rotatable in a circumferential direction by means of at least one coil spring for sensing and for compensating for wear-induced axial play between the housing component and the pressing plate, wherein the coil spring is mounted on the one hand on the ramp ring side and on the other hand on the housing component side, there being a hook-in securing means provided between the ramp ring and the coil spring.

It is therefore an object of the present invention to specify a clutch device and a coil spring which make it possible to prevent the coil spring from being separated from a ramp ring of the clutch device.

This object is fulfilled by a clutch device having at least one torque transmission device, which has at least one pressure plate which is connected non-rotatingly to a housing component, a pressing plate which may be moved non-rotatingly and in an axial direction with respect to the pressure plate, and a clutch plate which may be clamped in a frictionally engaged manner between the pressure plate and the pressing plate, and having at least one wear adjustment device which has at least one ramp ring which can be rotated in a circumferential direction by means of at least one wound coil spring for sensing and for compensating for wear-induced axial play between the housing component and the pressing plate, wherein the coil spring is mounted, on the one hand, on the ramp ring side and, on the other hand, on the housing component side. Through the use of a hook-in securing means provided between the ramp ring and the coil spring, it is possible to prevent a separation of the coil spring from the ramp ring in the event of a brief blocking or jamming of the coil spring or in the event of rotational speed fluctuations when the clutch device is operated.

Simple friction clutches, for example, in the form of a starting and decoupling clutch between the combustion engine and the transmission of a motor vehicle, or dual clutches having two integrated friction clutches as torque transfer devices, for example, for dual clutch transmissions having two partial transmissions which can be coupled with a combustion engine by means of the friction clutches, or having a transmission drive and an auxiliary drive for implements, may be used as the clutch device. The friction clutches for coupling additional driving or driven shafts of functional units such as power take-offs, electric machines and/or additional transmission input shafts may be provided as other advantageous designs. On its input side, the clutch device may, for example, be connected with or integrated into a damping device for damping torsional vibrations, for example, by means of a dual mass flywheel. Alternatively, or in addition, the clutch device may contain components of axially elastic design for damping axial and/or tumbling vibrations.

The clutch device may have two friction clutches forming a dual clutch for a dual clutch transmission as torque transfer devices, where at least one friction clutch has a wear adjustment device with at least one coil spring. It goes without saying that when a dual or multiple clutch is used as the clutch device, the wear of a plurality of or all torque transfer devices can in each case be compensated for with one of the proposed wear adjustment devices.

The type of torque transfer device or friction clutch depends on the application. It may be a so-called pushed or pulled friction clutch, which can be forcibly disengaged or forcibly engaged. Depending on the type of friction clutch used, the adjustment for wear may therefore be made, for example, in the disengaged or engaged state, or with the friction clutch in the disengaged or engaged state with overtravel, or after storing the travel to be adjusted, the next time the friction clutch is actuated.

Common to all wear adjustment devices is a ramp device which is able to be rotated in a circumferential direction against the stored energy of at least one energy storage device, counter to the clutch housing or a housing component that rotates with the crankshaft of the combustion engine and of the pressure plate, in such a way that the travel to be compensated for comes to rest against the clutch housing or a component connected to the latter, due to the increased ramp height after rotation. The ramps may be arranged, for example, in the form of a ramp ring around the circumference, while a ramp ring corresponding to this with ramps running in the opposite direction may be provided on the clutch housing or non-rotatingly connected to the latter.

A lever element used to actuate the torque transfer device or the friction clutch is braced against the clutch housing or against a housing component, and when operated moves the pressing plate in an axial direction. Depending on the requirement of the type of friction clutch—forced open or closed, pulled or pushed—the lever element may be a one-armed or two-armed lever, which applies force to the pressing plate radially outside or between a contact surface provided radially outside for the pressing plate and an end section of the pressing plate lying radially on the inside, and moves the pressure plate axially with a corresponding lever ratio when the radially inner side moves axially, thereby actuating the friction clutch. Instead of a rigid lever, disk-shaped radially inside segmented components, so-called diaphragm springs, for example, may be used, which have elastic capabilities in an axial direction.

By preference, elastic strip material, preferably steel, is used for the coil spring. This strip material may be used in a single layer, but may also be used in two or more layers, in which case the individual layers, preferably, the ends of the individual layers, are joined to each other. The connection is preferably made by material bonding, in particular, by welding or soldering.

Because of the elastic strip material, with a high spring stiffness, the winding length of the rolled-up strip material can be used. This has the advantage in particular that an appropriately designed winding length permits a large torsional angle of the ramp device. An energy storage device in the form of a coil spring, used in this manner, can rotate the ramp device by coiling the rolled spring packet, in which case it can be advantageous, with the pushed version, if the spring strip that has already been coiled is braced and thereby protected against bending or kinking.

A clutch device can be especially advantageous in which a plurality of coil springs distributed around the circumference are placed in cutouts distributed outside of the ramp device around the circumference which are introduced into the clutch housing and are attached to the ramp device, for example, a ramp ring. Hooking flattened band material in cutouts in the ramp ring can be advantageous. Likewise, the ramp ring may have protrusions into which the coil springs are hooked by means of fastening openings provided at the free end of the coil springs. It goes without saying that they may also be fastened or affixed to a component that is connected to the ramp ring.

The clutch device may include one or more wear adjustment devices, each consisting of two ramp devices, which are preferably provided in the axial direction between the housing component and the pressing plate. One of these ramp devices is provided to sense the wear travel, while the other ramp device is provided to adjust the sensed wear travel, where at least one of the two ramp devices has at least one wound coil spring as an energy storage device. It goes without saying that additional ramp rings, or ramp devices equipped in other ways, independent of their function in a wear adjustment device, may be rotated in an advantageous manner by the proposed coil springs in all the described forms.

The coil spring as the energy storage device of the wear adjustment device is thus mounted on the one hand on the ramp ring side and on the other hand on the housing side, while the hook-in securing means assignable to the ramp ring or the coil spring is provided between the ramp ring and the coil spring. The hook-in securing means is designed to prevent the coil spring from becoming separated from the ramp ring of the clutch device by mechanical means, i.e., in particular, by frictional locking and/or positive locking.

Preferably, the coil spring has a winding section with at least one spring winding which is provided in the area of the attachment of the coil spring on the housing component side, and an essentially non-coiled strip section to which the winding section gives way in the direction of the ramp-side attachment of the coil spring. The winding section consists advantageously of a plurality of spring windings, which are wound, for example, around a spring sheath. In an attachment area of the clutch housing or the housing component, the winding section of the coil spring is connected to the clutch housing or to the housing component for example, by a rivet, in particular, a hammer-head rivet, a stepped bolt, or a screw. However, a floating support of the winding section, in particular, without a spring sheath, in a correspondingly designed attachment area of the clutch housing or of the housing component, is also possible.

The hook-in securing means is preferably of elastic design, so that it returns at least partially to its initial state after the coil spring has been mounted on the ramp ring, during which the hook-in securing means has become deformed in its elastic zone.

In particular, it is advantageous if the hook-in securing means is designed as a snap securing means. Preferably, the hook-in securing means designed as a snap securing means snaps back to its initial state after the coil spring has been mounted on the ramp ring side.

According to another preferred exemplary embodiment, the hook-in securing means is provided on the coil spring side, in which case the hook-in securing means in particular is preferably designed in a single piece with the coil spring. Like the entire coil spring, the hook-in securing means is also preferably made of elastic strip material, in particular, preferably of steel.

The hook-in securing means is also preferably provided in an area of a fastening opening of the coil spring. By means of the fastening opening, the coil spring, preferably, a free end of a strip section of the coil spring, is hooked into a projection on the ramp ring side. The projection on the ramp ring side is preferably designed essentially in the form of a hook. The hook-in securing means preferably delimits the fastening opening in the circumferential direction of the clutch device.

The hook-in securing means is preferably situated between a winding section of the coil spring mounted on the side of the housing component and the fastening opening. This makes it possible for the securing means to not be worn out by the hook-shaped projection when the coil spring is pre-stressed under tension.

According to another preferred exemplary embodiment, the length of the fastening opening is smaller than the maximum length of the hook-shaped projection in the circumferential direction of the clutch device. The total length of the fastening opening and the hook-in securing means is at least equal to, preferably greater than the maximum length of the hook-shaped projection in the circumferential direction of the clutch device, so that the hook-shaped projection can be hooked in in a simple manner and then secured against becoming detached by the hook-in securing means. In particular, the hook-in securing means prevents the longest section of the hook-shaped projection in the circumferential direction—the actual hook—from being able to become detached on its own from the shorter fastening opening under the influence of force in the circumferential direction.

It is also advantageous if the hook-in securing means has at least one tongue, which is formed in a single piece with the strip section of the coil spring. The tongue has an edge, which delimits the fastening opening of the coil spring in the circumferential direction of the clutch device. The hook-in securing means, preferably, the tongue of the hook-in securing means, thus adjoins the fastening opening directly. It is particularly advantageous if both the fastening opening and the hook-in securing means, or the tongue of the hook-in securing means, are formed in the strip section of the coil spring, that is, in the non-coiled section of the coil spring.

Preferably, a bending zone is provided between the tongue and the rest of the coil spring, whereby the tongue snaps back to its initial state, preferably elastically, after the hook-shaped projection has passed through the fastening opening. The bending zone is preferably provided in the circumferential direction or in the axial direction of the clutch device between the tongue and the rest of the coil spring, so that the tongue is fastened to the rest of the coil spring, in particular to the strip section, or protrudes from the rest of the coil spring, in particular, from the strip section, in the circumferential direction or in the axial direction of the clutch device, by means of the bending zone.

The forenamed object is also fulfilled by a coil spring, having a winding section that has at least one spring winding and gives way to a strip section, where the strip section has at last one fastening opening in the area of a free end, into which an essentially hook-shaped projection may be hooked and is securable against becoming detached by an essentially tongue-shaped hook-in securing means. In particular, the coil spring is suitable and designed for use in a wear adjustment device of a previously named clutch device.

Preferably elastic strip material, preferably steel, is used for the coil spring. This strip material may be used in a single layer, but may also be used in two or more layers, in which case the individual layers, preferably, the ends of the individual layers, are joined to each other. The connection is preferably made by material bonding, in particular, by welding or soldering.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

FIGS. 1 through 5 relate to a preferred exemplary embodiment of clutch device 1 for a motor vehicle. Features that are not identified in the present description as essential to the invention are to be understood as optional. The following description therefore also relates to additional exemplary embodiments of clutch device 1 which have partial combinations of the features that will be explained below. The present description also relates to an exemplary embodiment of coil spring 38 for the aforementioned clutch device 1.

Figure 1:
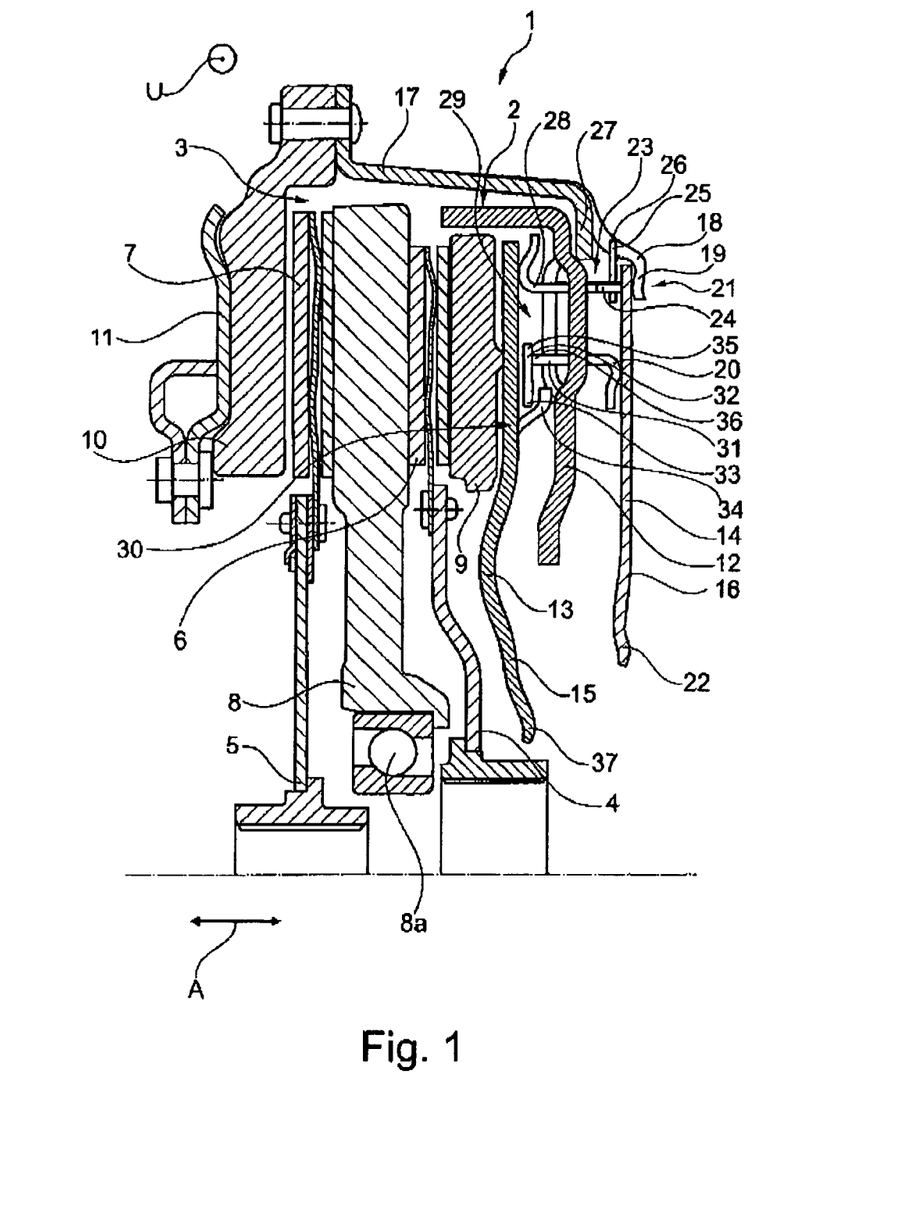
FIG. 1 is a half-sectional view through an exemplary embodiment of a clutch device.

The exemplary embodiment of clutch device 1 depicted in FIG. 1 includes two torque transfer devices 2, 3, which are shown in the disengaged, i.e., open state. Torque transfer devices 2, 3 are preferably frictional partial clutches, so that clutch device 1 is preferably designed as a dual clutch. Clutch device 1 also has two clutch plates 4, 5, which can be connected to different transmission input shafts, where the transmission that has these shafts can advantageously form a power-shift transmission that can have two partial transmissions.

Clutch plates 4, 5 have friction linings 6, 7 radially on the outside, which may be clamped in axial direction A between pressure plate 8 common to two torque transfer devices 2, 3 and pressing plate 9, 10 assigned to respective torque transfer devices 2, 3. Pressure plate 8 forms a component of a flywheel, which is connected to a combustion engine. Pressure plate 8 is connected through regions running in axial direction A, which are not shown in further detail here, to drive plate or drive basket 11. This may be designed as a driver ring. The axially-running regions, which produce a connection between pressure plate 8 and its drive basket 11, may be formed either on pressure plate 8 or on drive basket 11, or may also be provided at least partially on both parts. Drive basket 11 may either be capable of being bolted together with a driving plate provided, for example, on the crankshaft of the drive motor in the nature of a torque converter, or else may be connectable through an axial plug connection to a drive element situated on the motor side.

Pressure plate 8 is supported on the transmission side by means of bearing 8a and is fixed in at least one axial direction, in order to capture the necessary locking forces in axial direction A for at least one of torque transfer devices 2, 3. Pressure plate 8 can thus be supported on a transmission input shaft or braced in axial direction A. However, as a variation of this doctrine, it may also be received on a support piece or support pipe which is firmly connected to the transmission housing, and be braced in axial direction A.

As may be seen from FIG. 1, clutch plates 4, 5, in axial direction A between their two annular friction linings 6, 7, have a lining resiliency which guarantees a progressive buildup and breakdown of the torque transmissible by torque transfer devices 2, 3 over at least a part of the actuation travel.

First pressing plate 9, which belongs to first torque transfer device 2, is connected indirectly or directly to pressure plate 8, preferably, by means of leaf-spring-type elements, non-rotatingly but movable to a limited degree in axial direction A. Second pressing plate 10, which belongs to second torque transfer device 3, is coupled with pressure plate 8 as a drive in a similar way. Attached to pressure plate 8 is housing component 12, which is designed here as a sheet metal cover. In axial direction A on both sides of this housing component 12, lever elements 13, 14 are provided in an annular configuration, by means of which respective torque transfer device 2, 3 is operable.

Lever elements 13, 14 can each form an annular component which has diaphragm-spring-like properties; that is, its conicity is elastically changeable. Below, respective first and second lever elements 13, 14 which are combined into an annular component are referred to respectively as first and second lever springs 15, 16. These lever springs 15, 16 preferably each possess a spring property which guarantees that they tend to stand up in a truncated conical position, which corresponds to an open state of torque transfer devices 2, 3.

Second pressing plate 10 carries tension means 17, which extend in axial direction A and carry, on their end 18 facing away from second pressing plate 10, a pivot support or contact surface, on which second lever spring 16 which belongs to second torque transfer device 3 is tiltably or swivelingly supported. In the depicted exemplary embodiment, contact surface 19 is designed in a single piece with the tension means, and is formed by an annular region which is directed radially inward.

Tension means 17 can be formed by individual hook-type components which are distributed in circumferential direction U, preferably uniformly. In an advantageous manner, however, these tension means 17 can also be combined into a component, preferably made from sheet metal, which has an annular-shaped area, preferably closed, from which a plurality of axial shanks may extend, which are firmly connected to second pressing plate 10.

Radially inside of contact surface 19, second lever spring 16 is supported on a ramp device in the form of annular first ramp ring 20. Annular first ramp ring 20 is clamped in axial direction A between housing component 12 and second lever spring 16, and forms a component of first wear adjustment device 21, by means of which the wear occurring on second friction linings 7 belonging to second torque transfer device 3 can be compensated for at least partially automatically. To close second torque transfer device 3, radially inner first tips 22 of second lever spring 16 are impinged upon to the left in reference to FIG. 1. To this end, an actuating element which introduces the closing force into second torque transfer device 3 is provided, for example, an actuating bearing, which is not shown in further detail. This actuating element forms a component of an actuating system, which may be designed as a pneumatically, hydraulically, electrically or mechanically operated actuating system or has a combination of the aforementioned operating options, i.e., which is designed, for example, as an electrohydraulic actuating system.

The spring means which guarantee the torque transfer and the axial movability of second pressing plate 10, such as, in particular, leaf springs which connect pressure plate 8 and second pressing plate 10 in a known manner, preferably possess a defined axial pre-tensioning which guarantees that force is applied to second pressing plate 10 in the opening direction of second torque transfer device 3. This means that in the case of the depicted exemplary embodiment, second pressing plate 10 is forced away from pressure plate 8 in axial direction A, toward the left in reference to FIG. 1, by the aforementioned pre-tensioned leaf springs. Two friction linings 7 are thereby released. The pre-tensioning of the corresponding spring means, such as the leaf springs in particular, should also guarantee that contact surface 19 is always forced axially in the direction of the radially outer regions of the second lever spring.

First ramp ring 20 forms an adjusting ring, which is supported in axial direction A by means of the ramp device on housing component 12. The ramp device has ramps which run in circumferential direction U and rise in axial direction A. These ramps can be formed in a known manner directly on first ramp ring 20, and the opposing ramps which work together with the ramps can be introduced in an advantageous manner directly into the region of the housing floor of housing component 12. In circumferential direction U, force is applied to first ramp ring 20 by at least one coil spring 38, depicted in additional detail in FIGS. 3 through 5, in circumferential direction U or in the adjustment direction.

First wear adjustment device 21 also includes first sensor device 23, which has a sensor ring designed as second ramp ring 24, which is supported by means of a ramp device on the housing floor of housing component 12 in a manner similar to that described in connection with first ramp ring 20, and to which force is applied circumferentially in the adjustment direction by at least one spring, preferably, at least one coil spring 38. Second ramp ring 24 is situated in axial direction A between housing component 12 and the outer regions of first lever spring 16, namely, at the radial level of contact surface 19.

In addition, first sensor device 23 has first sensor element 25, which preferably has axially springy regions. Provided no wear has occurred, first sensor element 25 clamps second ramp ring 24 in axial direction A such that the latter is held so that it cannot rotate. First sensor element 25 has first contact regions 26, which are able to interact with opposing contact regions 27 borne by tension means 17, namely, in particular, when wear appears on second friction linings 7. The axial arrangement of first contact regions 26 and of first opposing contact regions 27, as well as the axial distances which appear between these when second torque transfer device 3 is actuated, are matched to each other in such a way that upon a closure of second torque transfer device 3 when there is no wear, a maximum of only one contact can occur between first contact regions 26 and first opposing contact regions 27.

However, if wear is present, first contact regions 26 come to rest on first opposing contact regions 27 before the complete closing distance or engagement distance of second torque transfer device 3 has been reached. Depending on the wear that has occurred, this causes an axial displacement of first contact regions 26 with respect to at least second ramp ring 24. This axial displacement causes the sensor ring designed as second ramp ring 24 to tend to be unloaded, so that it is able to rotate by an angle which depends on the wear detected by first sensor element 25. The axial displacement of second ramp ring 24 which then occurs relative to housing component 12 is guaranteed by the ramp device provided between second ramp ring 24 and that housing component 12.

When opening, i.e., disengaging second torque transfer device 3, second lever spring 16 is forced back into an angular position, in which radially inner first tips 22 of second lever spring 16 occupy an at least approximately unchanging or constant axial position. Because of the wear compensation that has occurred by means of first sensor device 23, which brings about a corresponding displacement of contact surface 19 in axial direction A, toward the right in reference to FIG. 1, support ring or first ramp ring 20 is unloaded when second torque transfer device 3 is opened, so that this ring also undergoes a rotation which brings about a corresponding displacement of first ramp ring 20 in axial direction A, toward the right in reference to FIG. 1, because of the ramp device being present between housing component 12 and first ramp ring 20.

First sensor element 25, which has first contact regions 26, can be formed by an annular component which has individual attachments with housing component 12, preferably, distributed uniformly around the circumference. The regions of annular first sensor element 25 present between these attachments carry first contact regions 26. The regions of first sensor element 25 provided in circumferential direction U between the attachments can be elastically or resiliently shaped in axial direction A. For some applications, it can be expedient if these regions are also subjected to a torsional loading, which causes at least a slight twisting at least of the regions with reduced radial width, which extend circumferentially to the sides of first contact regions 26.

First lever spring 15 of first torque transfer device 2 is provided opposite second lever spring 16 in axial direction A on the other side of housing component 12. First lever spring 15 is supported by a radially outer region on a support ring or on third ramp ring 28. Third ramp ring 28, provided as an adjusting ring, is rotatable in relation to housing component 12 in a manner similar to that described in connection with first ramp ring 20, and is supported axially on the housing by means of a ramp device. Third ramp ring 28 forms a component of second wear adjustment device 29, which operates between the radial regions of housing component 12 and first lever spring 15. Between first pressing plate 9 and first pressure plate 8 and/or housing component 12 torque transfer means are provided, which are preferably formed by known leaf springs that are pre-tensioned in axial direction A in such a way that first pressing plate 9 is pressed in axial direction A against first lever spring 15. The total axial force that acts on first lever spring 15, toward the right in reference to FIG. 1, is calculated so that during operation of clutch device 1 an axial movement or swiveling of first lever spring 15 due at least to resonance phenomena and/or axial vibrations or tumbling vibrations of at least individual components of clutch device 1 is prevented. In addition to the leaf spring elements, other energy storage devices or spring elements may possibly be provided, which act on first pressing plate 9 or directly on first lever spring 15.

Second wear adjustment device 29 includes in addition second sensor device 30, which is situated radially inside of and at a distance from third ramp ring 28. Second sensor device 30 includes a sensor ring in the form of fourth ramp ring 31, which can be moved with respect to housing component 12 and is supported by a ramp device, similar to second ramp ring 24.

In addition, second sensor device 30 has second sensor element 32, which is carried either indirectly or directly by housing component 12. Second sensor element 32 has at least one, preferably, a plurality of second contact regions 33 distributed around the circumference, which work together with second opposing contact regions 34, at least when wear appears on first friction linings 6 of first clutch plate 4. Second opposing contact regions 34 can be formed by elements that are connected to first lever spring 15. It is especially advantageous if second opposing contact zones 34 are formed by tongues that are designed in a single piece with first lever springs 15.

Second sensor element 32 has regions 35 which work together with additional regions of fourth ramp ring 31 under axial pre-tensioning. Fourth ramp ring 31 is clamped in axial direction A due to the axial pre-tensioning of at least the regions 35, thus preventing a rotation of the fourth ramp ring, at least when there is no wear on first friction linings 6. This prevents an uncontrolled adjustment of second wear adjustment device 29 which is not attributable to wear. Second sensor element 32 may likewise be formed by an annular component, which is connected to and operative with housing component 12 in a similar design to that described in connection with first sensor element 25.

The axial distance between second contact zones 33 and second opposing contact zones 34, visible from FIG. 1, is dimensioned so that when first torque transfer device 2 is fully closed and there is no wear on first friction linings 6, only a touch or soft contact between these regions 33, 34 occurs, which guarantees that fourth ramp ring 31 remains blocked against rotation.

The closing of first torque transfer device 2 takes place in a similar manner to that described in connection with second torque transfer device 3. A closing force is introduced by means of an actuating device in the region of radially inner second tips 37 of first lever spring 15, toward the left in reference to FIG. 1. This closing force is built up gradually, until the axial force exerted on first pressing plate 9 is sufficient to pass the torque emitted by the motor through first clutch plate 4 to the transmission. The maximum pressing force in this case can have at least a constant value. It can also be advantageous, however, to adapt this closing force appropriately, depending on the operating state of the motor and of the emitted torque. This means that if the motor is putting out only 50% of its nominal torque, the pressing force can be reduced accordingly. A similar operation is also possible for second torque transfer device 3.

Figure 2:
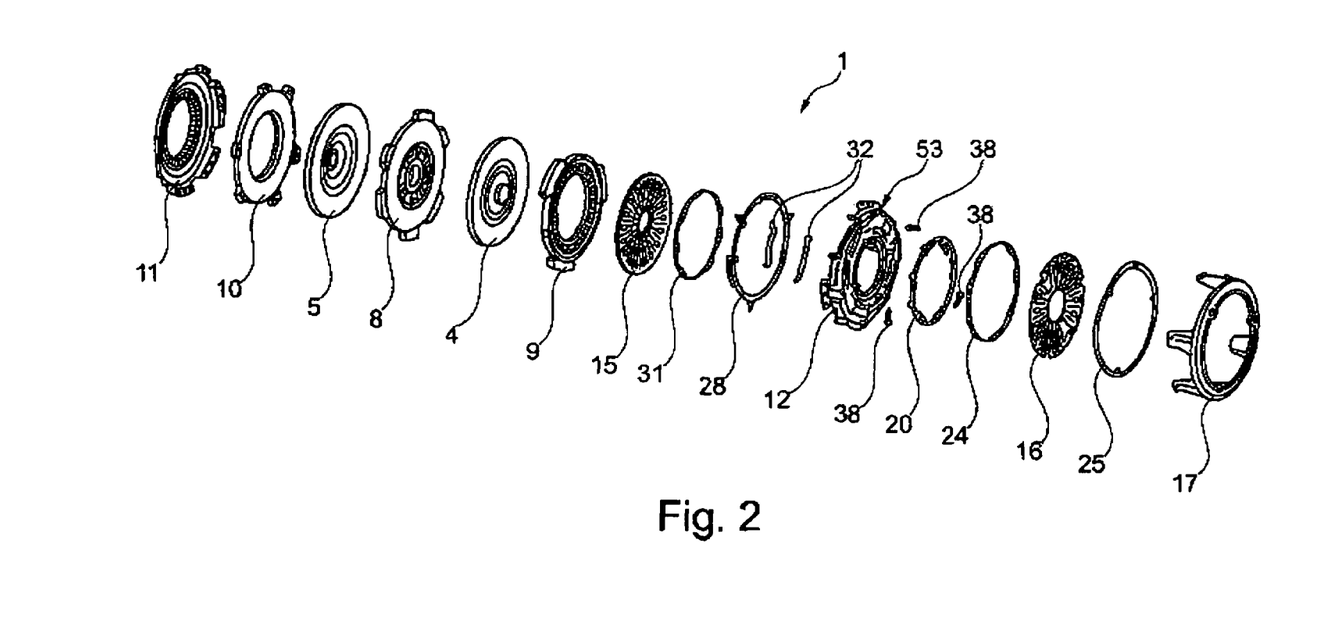
FIG. 2 is an exploded view of the clutch device from FIG. 1.

Some design features of such clutch device 1 may be seen from the exploded view of clutch device 1 depicted in FIG. 2. The corresponding components are provided with the reference labels of the preceding description. Three coil springs 38 distributed around the circumference, which on the one hand are attached in corresponding attachment regions 53 on housing component 12 and on the other hand are connected to second ramp ring 24, are merely hinted at. It goes without saying, that alternatively or in addition first ramp ring 20 as well as third ramp ring 28 and also fourth ramp ring 31 can be supported by proposed coil springs 38 to rotate.

Figure 3:
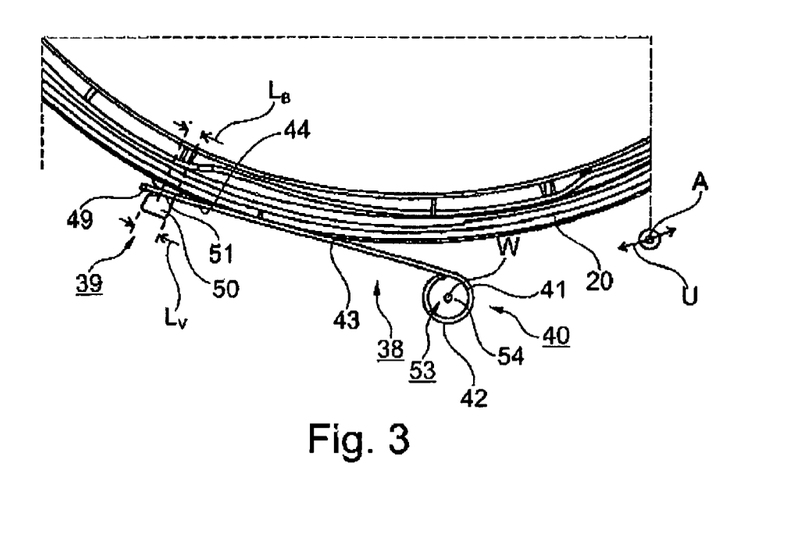
FIG. 3 is a detailed view of a ramp ring of the clutch device from FIG. 1 with a coil spring hooked in, in a top view.

FIG. 3 depicts a ramp ring of clutch device 1 with single coil spring 38 attached to it. First ramp ring 20 is depicted here by way of example; the coil springs may be attached in the same way to second, third or fourth ramp ring 24, 28, 31. Furthermore, in FIG. 4 coil spring 38 is depicted in the pre-tensioned state alone, that is, without the ramp ring.

Figure 4:
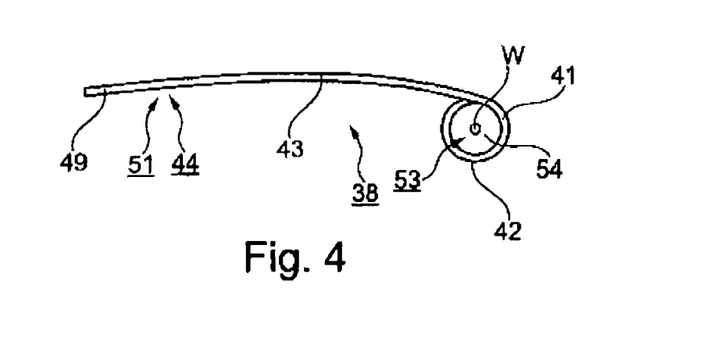
FIG. 4 is the coil spring from FIG. 3 in a non-hooked-in state in a top view; and, FIG. 5 is a perspective view of the coil spring from FIG. 3.

Coil spring 38 is fastened to ramp ring 20 by means of attachment 39 on the ramp ring side. To this end, ramp ring 20 has, for example, in its outside circumference projection 50, preferably essentially hook-shaped, to which coil spring 38 is attached by means of corresponding fastening opening 51. Instead of projection 50 it is however also possible, for example, for ramp ring 20 to have a cut-out, into which coil spring 38 is hooked by means of a bent-over end. Other manners of attachment, in particular, releasable attachment of coil spring 38 to ramp ring 20, are also possible.

Furthermore, coil spring 38 is fastened to housing component 12 or to some other component of the clutch housing by means of attachment 40 on the housing component side. To this end, housing component 12 or the other component of the clutch housing has specially designed fastening zone 53. Fastening zone 53 contains, for example, an indentation, into which winding section 41 of coil spring 38 is placed and connected to housing component 12 or the other component of the clutch housing by means of rivet 54, in particular, a hammer-head rivet, a stepped bolt, or a screw. To improve the guidance, coil spring 38 may have, for example, within its winding section 41 a spring sheath or the like. Alternatively, it is also possible, however, to support coil spring 38 floating in fastening zone 53, that is, without being attached by means of rivet 54, stepped bolt, or screw.

Figure 5:
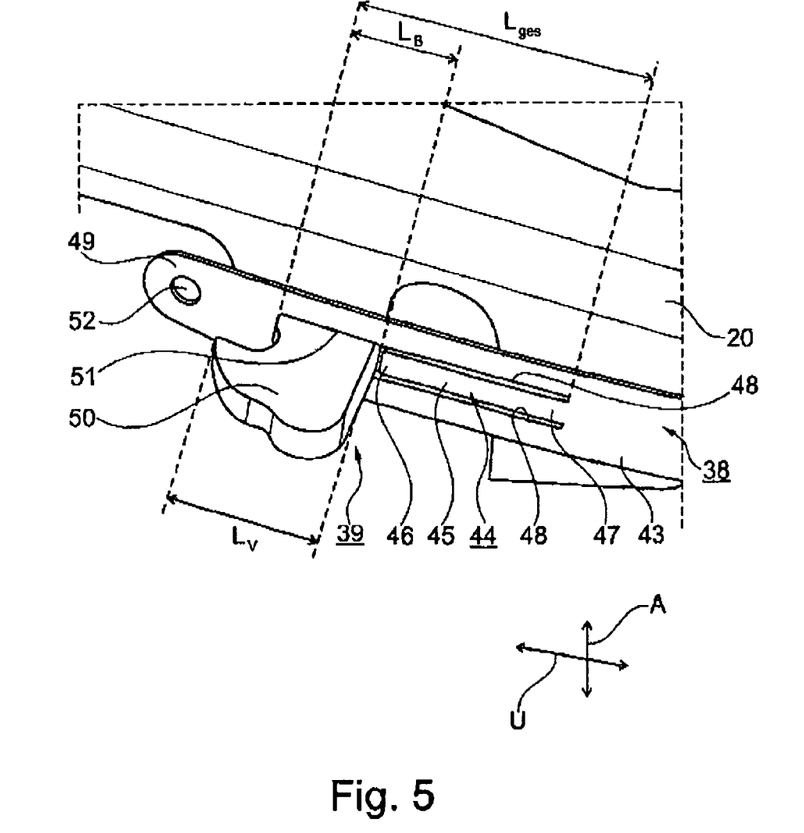

Winding section 41 includes one or more spring windings 42, which are wound around a winding axis W and which are provided in the area of attachment 40 of coil spring 38 on the housing component side. Winding section 41 gives way with its radially outermost spring winding 42 to strip section 43 of coil spring 38. Strip section 43 is essentially not rolled up, but has a pre-tensioning in the wind-up direction. Strip section 43 is fastened on the ramp ring side by means of its free end 49. To this end, free end 49 is attached by means of fastening opening 51 to hook-shaped projection 50 of ramp ring 20, or hooked into the cut-out of ramp ring 20.

All-in-all, coil spring 38 is situated with respect to ramp ring 20 in such a way that in the radial direction of clutch device 1 strip section 43 of coil spring 38 is situated between winding section 41 of coil spring 38 and ramp ring 20. Because of the pre-tensioning in the winding direction, coil spring 38 tends to become detached from attachment 39 on the ramp ring side or from ramp ring 20, by means of an unhooking force that operates at right angles to strip section 43. Besides fastening opening 51, through which free end 49 of strip section 43 is hooked into projection 50 on the ramp side, free end 49 of strip section 43 preferably has assembly tool opening 52.

During installation, coil spring 38 is usually attached on the housing side first. Since, because of its pre-tensioning, coil spring 38 tends to roll up almost completely over winding section 41 and strip section 43, an assembly tool can be hooked into assembly tool opening 52 in order to unwind coil spring 38 at least part way and to attach fastening opening 51 to projection 50 on the ramp ring side. To this end, assembly tool opening 52 is preferably provided at a greater distance from winding section 41 of coil spring 38 than fastening opening 51.

In the depicted exemplary embodiment, hook-in securing means 44 is also provided between ramp ring 20 and coil spring 38. Stated more precisely, hook-in securing means 44 is provided in an area of fastening opening 51 of coil spring 38, with hook-in securing means 44 preferably delimiting fastening opening 51 in the circumferential direction U of clutch device 1. Hook-in securing means 44 not only prevents coil spring 38 from becoming detached due to its pre-tensioning in the winding direction, but, in particular, prevents separation of coil spring 38 from ramp ring 20 during brief blocking or jamming of coil spring 38 or in the event of rotational speed fluctuations when operating clutch device 1.

Hook-in securing means 44 is preferably of elastic design, so that it returns at least partially to its initial state after the mounting of coil spring 38 on ramp ring 20, during which hook-in securing means 44 has become deformed in its elastic zone. To this end, hook-in securing means 44 is preferably designed as a snap securing means, which snaps back to its initial state after coil spring 38 has been mounted on the ramp ring side.

Furthermore, in the depicted exemplary embodiment, hook-in securing means 44 is provided on the coil spring side. In particular, hook-in securing means 44 is designed in a single piece with coil spring 38, more precisely with the rest of coil spring 38. Like entire coil spring 38, hook-in securing means 44 is also preferably made of elastic strip material, in particular, preferably, of steel.

Hook-in securing means 44 has tongue 45, which is designed in a single piece with spring section 43 of coil spring 38. If coil spring 38 is made of a plurality of layers, for example, two layers of strip material which are integrally joined with each other, it is possible for tongue 45 to likewise be designed in multiple layers, for example, two layers. It is also possible, however, for tongue 45 to be made of only a single one of the layers of strip material.

In the depicted exemplary embodiment, tongue 45 extends in the circumferential direction U of clutch device 1, that is, in the longitudinal direction of strip section 43. In axial direction A of the clutch device, that is, in the transverse direction of strip section 43, slits 48 are formed on both opposing sides of the tongue which separate tongue 45 from the rest of coil spring 38, more precisely, from strip section 43 of coil spring 38.

At its free end, tongue 45 has edge 46 which delimits fastening opening 51 of coil spring 38 in the circumferential direction U of clutch device 1, so that hook-in securing means 44 is situated in the circumferential direction U of clutch device 1 between fastening opening 51 and winding section 41 of coil spring 38. In the circumferential direction U, opposite edge 46, bending zone 47 is provided, in which the rest of coil spring 38 gives way to tongue 45. Because of bending zone 47, tongue 45 snaps back elastically to its initial state after hook-shaped projection 50 has passed through fastening opening 51.

Although this is not shown in the exemplary embodiment depicted in FIGS. 1 through 5, it is also possible for tongue 45 not to give way to the rest of coil spring 38 in the circumferential direction U of clutch device 1, but rather for bending zone 47 to be formed in the axial direction A of clutch device 1, that is, in the transverse direction of coil spring 38, between tongue 45 and the rest of coil spring 38. Thus, tongue 45 extends in the axial direction A of the clutch device, while slit 48, which separates a region of tongue 45 from the rest of coil spring 38, is essentially L-shaped, that is, it has a section that runs in the longitudinal direction of coil spring 38 and a section that runs in the transverse direction of coil spring 38.

It is likewise possible for hook-in securing means 44 to have two tongues 45. For example, in the transverse direction of coil spring 38, that is, in the axial direction A of clutch device 1, these two tongues 45 each have half the width of previously explained individual tongue 45. Each of two tongues 45 extends in the transverse direction of coil spring 38, and has bending zone 47 in which respective tongue 45 gives way in the transverse direction of the coil spring to the rest of the coil spring, more precisely to the strip section of coil spring 38. Regions of free ends of two tongues 45 are located opposite each other, and are separated by the base section of essentially T-shaped slit 48.

A feature common to all exemplary embodiments is that length $L_B$ of fastening opening 51 is smaller than maximum length $L_V$ of hook-shaped projection 50 in the circumferential direction U of clutch device 1. Short-formed fastening opening 51 in combination with hook-in securing means 44 in its initial state prevents coil spring 38 from becoming detached from hook-shaped projection 50 on the ramp side during operation of clutch device 1. On the other side, total length $L_{ges}$ of fastening opening 51 and hook-in securing means 44 is at least equal to, preferably greater than maximum length $L_V$ of hook-shaped projection 50 in the circumferential direction U of clutch device 1. It is thus, possible, when assembling clutch device 1, to hook coil spring 38 into hook-shaped projection 50 on the ramp ring side in a simple manner, where hook-in securing means 44 is elastically deformed while being attached, and returns again to its initial state after hook-shaped projection 50 has passed through fastening opening 51.

The preceding exemplary embodiments relate to clutch device 1 having at least one torque transmission device 2, 3, which has at least one pressure plate 8 which is connected non-rotatingly to housing component 12, pressing plate 9, 10 which may be moved non-rotatingly and in an axial direction A with respect to pressure plate 8, and clutch plate 4, 5 which may be clamped in a frictionally engaged manner between pressure plate 8 and pressing plate 9, 10, and having at least one wear adjustment device 21, 29 which has at least one ramp ring 20, 24, 28, 31 which is rotatable in a circumferential direction by means of at least one wound coil spring 38 for sensing and for compensating for wear-induced axial play between housing component 12 and pressing plate 9, 10, wherein coil spring 38 is mounted on the one hand on the ramp ring side and on the other hand on the housing component side, there being hook-in securing means 44 provided between ramp ring 20, 24, 28, 31 and coil spring 38.

In addition, the preceding exemplary embodiments also relate to a coil spring having winding section 41, which has at least one spring winding 42 and gives way to strip section 43, where strip section 43 has at least one fastening opening 51 in the area of free end 49, into which essentially hook-shaped projection 50 may be hooked and is securable against becoming detached by essentially tongue-shaped hook-in securing means 44. In particular, coil spring 38 is suitable and designed for wear adjustment device 21, 29 of clutch device 1 of the forenamed type.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

REFERENCE LABELS

1 Clutch device
2 Torque transfer device
3 Torque transfer device
4 Clutch plate
5 Clutch plate
6 Friction lining
7 Friction lining
8 Pressure plate
8a Bearing
9 Pressing plate
10 Pressing plate
11 Drive basket
12 Housing component
13 Lever element
14 Lever element
15 Lever spring
16 Lever spring
17 Tension means
18 Turned-away end
19 Contact surface
20 Ramp ring
21 Wear adjustment device
22 Radially inner tips
23 Sensor device
24 Ramp ring
25 Sensor element
26 Contact zone
27 Opposing contact zone
28 Ramp ring
29 Wear adjustment device
30 Sensor device
31 Ramp ring
32 Sensor element
33 Contact zone
34 Opposing contact zone
35 Region
36 Region
37 Radially inner tips
38 Coil spring
39 Attachment on ramp ring side
40 Attachment on housing component side
41 Winding section
42 Spring winding
43 Strip section
44 Hook-in securing means
45 Tongue
46 Edge
47 Bending zone
48 Slit
49 Free end
50 Projection
51 Fastening opening
52 Assembly tool opening
53 Fastening zone
54 Rivet
A Axial direction
U Circumferential direction
W Winding axis
$L_B$ Length of the fastening opening
$L_V$ Maximum length of the hook-shaped projection
$L_{ges}$ Total length

What is claimed is:

1. A clutch device, comprising:
    at least one torque transmission device, comprising:
        a housing component;
        at least one pressure plate fixedly secured to said housing;
        a pressing plate operatively arranged to move axially with respect to said at least one pressure plate; and,
        a clutch plate having first and second axial sides, said clutch plate operatively arranged to frictionally engage said at least one pressure plate and said pressing plate at said first and second axial sides, respectively; and,
    at least one wear adjustment device comprising:
        at least one ramp ring clamped against said housing component and comprising at least one hook-shaped projection; and,
        at least one coil spring wound at one end and free at the other, said at least one coil spring arranged for sensing and for compensating for wear-induced axial play between said housing component and said pressing plate, said at least one coil spring comprising:
            an opening arranged to receive said at least one projection; and,
            a securing means arranged within said opening to prevent said at least one wound coil from becoming detached from said ramp ring during operation of said clutch.

2. The clutch device recited in claim 1, wherein said securing means is made of elastic design.

3. The clutch device recited in claim 1, wherein said securing means is designed as a snap securing means.

4. The clutch device recited in claim 3, wherein said securing means snaps back into its initial state after the coil spring has been mounted on the ramp ring side.

5. The clutch device recited in claim 1, wherein said securing means is provided on the coil spring side.

6. The clutch device recited in claim 5, wherein said securing means is designed in a single piece with the coil spring.

7. The clutch device recited in claim 1, wherein said securing means is provided in a region of a fastening opening of the coil spring.

8. The clutch device recited in claim 7, wherein said securing means delimits the fastening opening in the circumferential direction of the clutch device.

9. The clutch device recited in claim 7, wherein the coil spring is hooked by means of the fastening opening into the hook-shaped projection on the ramp ring side.

10. The clutch device recited in claim 9, wherein a free end of a strip section of the coil spring is hooked by means of the fastening opening into the hook-shaped projection on the ramp ring side.

11. The clutch device recited in claim 7, wherein said securing means is situated between a winding section of the coil spring which is mounted on the housing component side and the fastening opening.

12. The clutch device recited in claim 7, wherein a length of the fastening opening is smaller than a maximum length of the hook-shaped projection in the circumferential direction of the clutch device, and wherein a total length of the fastening opening and the hook-in securing means is at least equal to the maximum length of the hook-shaped projection in the circumferential direction of the clutch device.

13. The clutch device recited in claim 7, wherein a total length of the fastening opening and the hook-in securing means is greater than a maximum length of the hook-shaped projection in the circumferential direction of the clutch device.

14. The clutch device recited in claim 7, wherein said securing means has at least one tongue, which is designed in a single piece with a strip section of the coil spring and which has an edge that delimits the fastening opening of the coil spring in a circumferential direction of the clutch device.

15. The clutch device recited in claim 14, wherein between the tongue and the rest of the coil spring, a bending zone is provided by which the tongue snaps back into its initial state after the hook-shaped projection has passed through the fastening opening.

16. The clutch device recited in claim 15, wherein the bending zone is arranged between the tongue and the rest of the coil spring in the circumferential direction.

17. The clutch device recited in claim 15, wherein the bending zone is arranged between the tongue and the rest of the coil spring in the axial direction.

18. The at least one coil spring for a wear adjustment device of a clutch device recited in claim 1, said at least one coil spring, comprising:
wound section; and,
a strip section connected to said wound section, said strip section including a free end and at least one opening proximate said free end and operatively arranged to receive and secure the essentially hook-shaped projection by an essentially tongue-shaped hook-in securing means.

19. A wear adjustment assembly for a clutch, comprising:
a housing;
a lever spring;
a ramp ring clamped between said housing and said lever spring, said ramp ring having at least one projection; and,
at least one spring attached to said housing and said ramp ring and operatively arranged to rotate said ramp ring, said at least one spring comprising:
a winding section;
a non-coiled strip section; and,
an opening operatively arranged to receive said at least one projection to prevent said spring from becoming detached from said ramp ring.

20. A wear adjustment assembly for a clutch, comprising:
a housing;
a lever spring;
a ramp ring clamped between said housing and said lever spring, said ramp ring having at least one projection, said at least one projection having a first length; and,
at least one spring attached to said housing and said ramp ring and operatively arranged to rotate said ramp ring, said at least one spring comprising:
an opening having a second length, said second length being larger than said first length, said opening further comprising:
a securing means which can deform during assembly and during operation of said clutch prevent said spring from becoming detached from said projection.

* * * * *